Jan. 12, 1932.  V. FINA  1,840,441
DRIP TRAP
Filed Nov. 3, 1928

Inventor
Valentine Fina
By Ira Milton Jones
Attorney

Patented Jan. 12, 1932

1,840,441

UNITED STATES PATENT OFFICE

VALENTINE FINA, OF MILWAUKEE, WISCONSIN, ASSIGNOR TO MILWAUKEE VALVE COMPANY, OF MILWAUKEE, WISCONSIN, A CORPORATION OF WISCONSIN

DRIP TRAP

Application filed November 3, 1928. Serial No. 317,077.

This invention relates to certain new and useful improvements in traps and refers more particularly to a drip trap especially designed for use with heating apparatus.

Traps of this nature are connected in the supply main of a heating apparatus or other installation for the purpose of eliminating air and water produced by condensation and heretofore their construction has been cumbersome and expensive and, therefore, this invention has as one of its objects the provision of a drip trap of the character described in which the number of parts have been materially reduced to greatly facilitate the manufacture thereof.

Another object of this invention resides in the provision of a drip trap in which the thermostat chamber is an integral part of the body of the trap.

A further object of this invention resides in the formation of a by-pass in the cover of the trap which eliminates the cumbersome external piping heretofore found necessary.

Another object of this invention resides in the provision of a drip trap of the character described having a new and novel float controlled valve which is so mounted as to accommodate misalignment between the valve and its seat.

And a further object of this invention resides in the provision of an improved trap of the character described which is supported by the usual piping of the system and in which the working parts are carried by the cover to avoid the necessity of removing the trap from the line for cleaning and repairing.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof, and in which.

Figure 1:
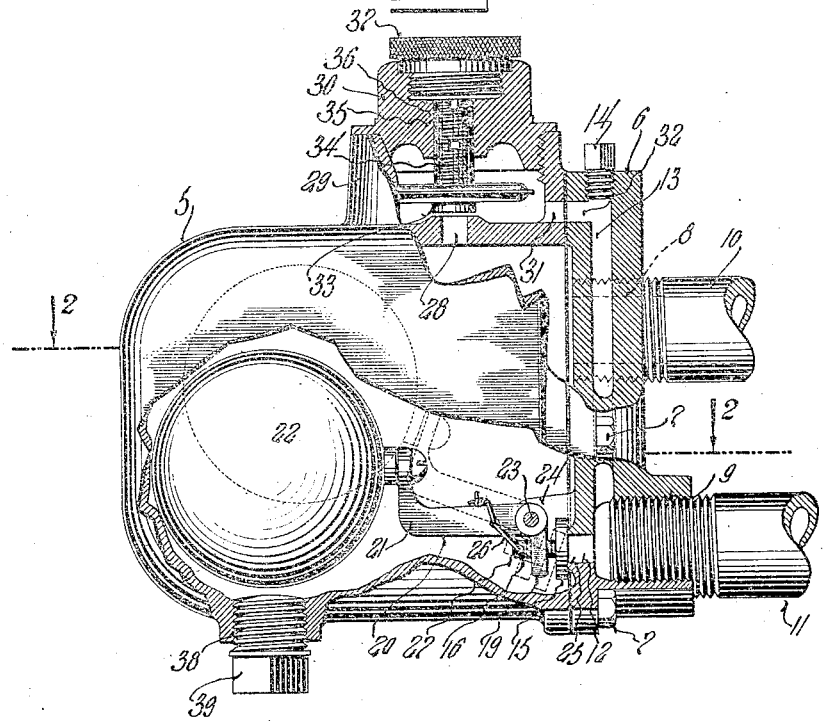
Figure 1 is a side elevational view of a drip trap embodying my invention, parts thereof being broken away and in section to illustrate structural details.
Figure 2:
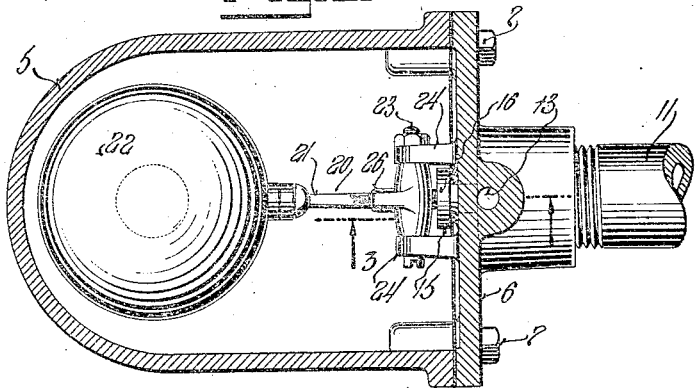
Figure 2 is a sectional view taken through Figure 1 on the plane of the line 2—2.
Figure 3:
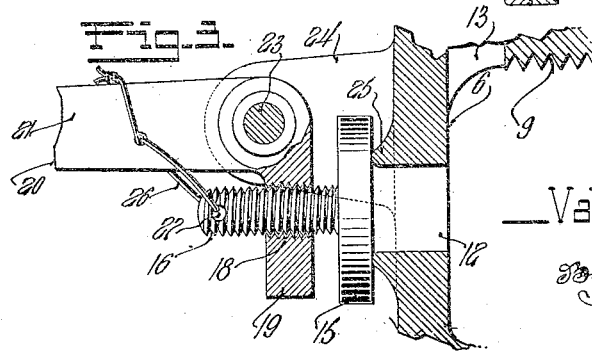
Figure 3 is an enlarged, fragmentary, detail view, partly in section and partly in elevation, illustrating the manner of connecting the valve with the float arm.

Referring now more particularly to the accompanying drawing, in which like numerals designate like parts throughout the several views, 5 represents the chamber-like body of a trap having an open end closed by a cover member 6 secured to the body member by cap screws, or the like, 7. The cover member 6 is provided with apertures 8 and 9 in which an inlet pipe 10 and an outlet pipe 11, respectively, are threaded. The inlet pipe 10 is connected with the supply main of a heating apparatus, not shown, and the outlet pipe 11 communicates with the return main of the system, not shown.

The threaded inlet opening 8 extends entirely through the cover whereas the outlet openings 9 is reduced at its inner end to form a valve opening 12. A by-pass opening 13 is also formed in the cover member by drilling downwardly from its top face to communicate the interior of the body with the outlet in a manner to be later described, a plug 14 closing its upper end. The valve opening 12 is normally closed to prevent the passage of fluid therethrough by a valve member 15 having an annular flange and a stud 16 extended therefrom and threaded in an aperture 18 in one arm 19 of a bell crank lever 20, the other arm 21 of which has a float 22 connected therewith. The bell crank 20 is pivotally mounted at its apex by a stud 23 passing through a pair of ears or lugs 24 extended inwardly from the inner face of the cover member.

Thus it will be seen that as the float 22 rises upon the accumulation of fluid within the body or housing 5, the valve 15 is opened and to accommodate any misalignment between the face of the valve 15 and the raised periphery 25 of the valve opening 12 which forms its seat, the threaded aperture 18 in which the stud 16 is threaded is slightly larger than the diameter of the stud. This provides a relatively loose connection therebetween and permits a limited amount of movement of the valve with respect to the bell crank lever 20 to insure the full seating of the valve. A flexible wire or other means 26 passed through an aperture 27 in the end of the stud and suitably secured to the arm 21 of the bell crank lever prevents turning of the valve out of the threaded aperture 18 but permits sufficient movement to insure perfect seating.

The by-passage connecting the interior of the body with the outlet around the valve 15 includes a second valve opening 28 formed in the upper wall of the body or housing 5 in axial alignment with an annular flange 29 which extends upwardly from the body member and has its outer end internally threaded to receive a cap member 30. The interior of the annular flange 29 is in communication with the interior of the housing 5 through the valve opening 28 and is also in communication with the by-pass 13 through an aperture 31 extending through the wall of the annular flange 29 and registering with an aperture 32 in the cover member and communicating with the by-pass 13.

The valve opening 28 is adapted to be closed by a thermostatic valve 33 of that type illustrated in a co-pending application of John Fraser, Jr., filed July 27, 1928, Serial No. 295,681, which is adjustably secured by its stud 34 threaded in an aperture 35 in the cap 30. A plug 36 is threaded in the aperture 35 above the stud 34 after the valve 33 has been adjusted and the outer counter-bored end of the cap member is closed by a protecting cover 37.

A drain opening 38 is formed in the bottom wall of the body and is normally closed by a plug 39.

The drip trap described may be used in numerous ways and especially to eliminate air and condensation from a steam heating apparatus, and when so used the cycle of the system is as follows: First the air within the system is vented through the valve opening 28 into the return main through the by-pass 13 and the pipe 11. As the condensation flows into the trap and raises the float 22 it opens the valve 15 to eliminate the condensate and as the condensate recedes the float drops and closes the valve. The steam which follows, by means of its higher temperature, then closes the thermostatic valve 33 and prevents the passage of steam therethrough. This cycle is repeated as often as air and condensation accumulates in the system.

From the foregoing description, taken in connection with the accompanying drawing, it will be readily apparent to those skilled in the art to which an invention of this character appertains that I provide a novel and improved drip trap which efficiently drains the condensate and which, by its simplified construction precludes the possibility of any of its parts becoming defective and greatly facilitates the manufacture thereof.

What I claim as my invention is:

1. A float controlled valve including a pivoted actuating member having a threaded aperture, a valve member having a part threaded in said aperture, and a valve seat with which the valve is engageable, the diameter of the threaded aperture being slightly greater than said valve carried part to permit relative movement therebetween to facilitate seating of the valve on its valve seat.

2. In a device of the character described, a valve seat, a valve, a valve actuating member having a threaded opening, a stem carried by the valve and loosely threaded in said aperture whereby the valve is supported entirely by the actuating member and limited movement of the valve with respect to the actuating member is permitted to insure perfect seating of the valve on its seat when it is closed, and flexible means preventing turning of the stem out of the threaded aperture.

In testimony whereof I have hereunto affixed my signature.

VALENTINE FINA.